United States Patent
Cheong et al.

(10) Patent No.: US 12,112,102 B2
(45) Date of Patent: ***Oct. 8, 2024

(54) TECHNIQUES FOR APPLYING GENERATIVE DESIGN TO THE CONFIGURATION OF MECHANICAL ASSEMBLIES

(71) Applicant: AUTODESK, INC., San Francisco, CA (US)

(72) Inventors: Hyunmin Cheong, Toronto (CA); Mehran Ebrahimi, Toronto (CA); Francesco Iorio, Toronto (CA); Adrian Butscher, Toronto (CA)

(73) Assignee: AUTODESK, INC., San Francisco, CA (US)

(*) Notice: Subject to any disclaimer, the term of this patent is extended or adjusted under 35 U.S.C. 154(b) by 822 days.

This patent is subject to a terminal disclaimer.

(21) Appl. No.: 17/164,319

(22) Filed: Feb. 1, 2021

(65) Prior Publication Data

US 2021/0157965 A1 May 27, 2021

Related U.S. Application Data

(63) Continuation of application No. 15/854,234, filed on Dec. 26, 2017, now Pat. No. 10,909,288.

(51) Int. Cl.
*G06F 30/15* (2020.01)
*G06F 30/17* (2020.01)
(Continued)

(52) U.S. Cl.
CPC .............. *G06F 30/15* (2020.01); *G06F 30/17* (2020.01); *G06F 30/3323* (2020.01);
(Continued)

(58) Field of Classification Search
CPC ....... G06F 30/15; G06F 30/3323; G06F 30/17; G06F 2111/04; G06F 2119/18; G06F 2111/02; G06F 2111/20
(Continued)

(56) References Cited

U.S. PATENT DOCUMENTS 5,297,054 A * 3/1994 Kienzle .................. G06F 30/00
706/919
5,867,397 A * 2/1999 Koza ...................... G06N 3/126
703/2

(Continued)

FOREIGN PATENT DOCUMENTS

CN 1836120 A 9/2006
CN 102509351 A * 6/2012
(Continued)

OTHER PUBLICATIONS

Lin, Yi-shih, et al. "A method and software tool for automated gearbox synthesis." International Design Engineering Technical Conferences and Computers and Information in Engineering Conference. vol. 49026. 2009. (Year: 2009).*

(Continued)

*Primary Examiner* — John E Johansen
(74) *Attorney, Agent, or Firm* — Artegis Law Group, LLP

(57) ABSTRACT

A design engine automates portions of a mechanical assembly design process. The design engine generates a user interface that exposes tools for capturing input data related to the design problem. Based on the input data, the design engine performs various operations to generate a formalized problem definition that can be processed by a goal-driven optimization algorithm. The goal-driven optimization algorithm generates a spectrum of potential design options. Each design option describes a mechanical assembly representing a potential solution to the design problem.

21 Claims, 6 Drawing Sheets

(51) Int. Cl.
*G06F 30/3323* (2020.01)
*G06F 111/02* (2020.01)
*G06F 111/04* (2020.01)
*G06F 111/20* (2020.01)
*G06F 119/18* (2020.01)

(52) U.S. Cl.
CPC ....... *G06F 2111/02* (2020.01); *G06F 2111/04* (2020.01); *G06F 2111/20* (2020.01); *G06F 2119/18* (2020.01)

(58) Field of Classification Search
USPC .......................................................... 703/7
See application file for complete search history.

(56) References Cited

U.S. PATENT DOCUMENTS

| | | |
|---|---|---|
| 6,629,065 B1 | 9/2003 | Gadh et al. |
| 7,840,443 B2 | 11/2010 | Lukis et al. |
| 8,239,284 B2 | 8/2012 | Lukis et al. |
| 2005/0159936 A1* | 7/2005 | Rees ........................ G06F 30/00 703/6 |
| 2006/0020629 A1* | 1/2006 | Ramani ................ G06Q 10/043 |
| 2006/0069962 A1* | 3/2006 | Dittmann ............ G01M 13/027 714/40 |
| 2016/0147217 A1* | 5/2016 | Davis ................. G05B 19/4097 700/97 |
| 2016/0147911 A1* | 5/2016 | Bergin .................... G06F 30/00 703/1 |
| 2017/0024511 A1* | 1/2017 | Cheong .................. G06F 30/17 |
| 2017/0024647 A1* | 1/2017 | Cheong .................. G06N 5/022 |
| 2017/0235851 A1* | 8/2017 | Yalamanchili .......... G06F 30/00 703/1 |

FOREIGN PATENT DOCUMENTS

| | | |
|---|---|---|
| CN | 104011629 A | 8/2014 |
| CN | 106095767 A | 11/2016 |
| DE | 10348718 A1 | 6/2005 |

OTHER PUBLICATIONS

Lin et al., "A Method and Software Tool for Automated Gearbox Synthesis", ASME IDETC/CIE 2009, DETC2009-86935, Sep. 2, 2009, pp. 1-11.

Beck et al., "Enforcing Connectivity in a Fixed Degree Graph: A Constraint Programming Case Study", 15 pages.

* cited by examiner

TECHNIQUES FOR APPLYING GENERATIVE DESIGN TO THE CONFIGURATION OF MECHANICAL ASSEMBLIES

CROSS-REFERENCE TO RELATED APPLICATIONS

This application is a continuation of U.S. patent application titled, "TECHNIQUES FOR APPLYING GENERATIVE DESIGN TO THE CONFIGURATION OF MECHANICAL ASSEMBLIES," filed Dec. 26, 2017 and having Ser. No. 15/854,234 (issued on Feb. 2, 2021 as U.S. Pat. No. 10,909,288). The subject matter of this related application is hereby incorporated herein by reference.

BACKGROUND OF THE INVENTION

Field of the Invention

Embodiments of the present invention relate generally to computer-aided design and, more specifically, to techniques for applying generative design to the configuration of mechanical assemblies.

Description of the Related Art

In the context of mechanical design and engineering, an "assembly" is a collection of mechanical parts that are coupled together in a manner that achieves a particular function to address a specific design problem. One example of an assembly is an automobile transmission that includes a collection of gears coupled together to provide torque conversions. The design problem addressed in this example is the need to transmit torque from the automobile crankshaft to the automobile wheels.

Designing a mechanical assembly is typically a manually-performed, multi-step process. Initially, a designer formulates the design problem to be addressed by the mechanical assembly by determining a set of objectives the assembly should meet. For example, when formulating the above-mentioned automobile transmission design problem, the designer could determine that the transmission should implement a specific conversion ratio in order to convert an input torque received from the automobile crankshaft to an output torque that is applied to the wheels of the automobile. In conjunction with determining the set of objectives, the designer may further define the design problem by determining a set of design constraints that the assembly should not violate. In the transmission design problem discussed above, for example, the designer could determine that the mass of the transmission should not exceed a particular value.

Once the designer determines the various objectives and constraints, the designer then selects mechanical parts to be included in the assembly. For example, the designer of the transmission could select a collection of gears for inclusion in the transmission. Finally, the designer determines specific physical couplings between the selected parts in an effort to achieve the different objectives without violating the various constraints. For example, the transmission designer could determine a specific arrangement of the selected gears to implement the desired conversion between input and output torques.

Through design processes similar to the above-described process, designers generate designs for various mechanical assemblies. Once a particular design is created using such a design process, a designer typically tests the design, typically via computer simulation, to determine whether the objectives are met without violating the constraints. This overarching process may be repeated indefinitely, in a trial-and-error fashion, until a successful design is found.

Conventional computer-aided design (CAD) applications do not provide tools that facilitate all aspects of the above-described design process. Accordingly, designers have to perform some or all of the above-described steps manually and/or mentally based on personal intuition and experience. In particular, designers oftentimes formulate design problems mentally and then proceed directly to the selection and arrangement of parts to create a related mechanical assembly. Problematically, however, this conventional approach by designers does not allow programmatic techniques to be applied when generating mechanical assembly designs.

More particularly, programmatic techniques for solving design problems typically require structured inputs that describe the design objectives and design constraints. However, because designers oftentimes formulate design problems mentally, as described above, no such inputs are produced, which precludes the use of programmatic techniques when designing mechanical assemblies. Consequently, designers are forced to rely on the lengthy trial-and-error design process described above.

As the foregoing illustrates, what is needed in the art are more effective techniques for designing mechanical assemblies.

SUMMARY OF THE INVENTION

Various embodiments of the present invention set forth a computer-implemented method for generating design options for mechanical assemblies, including generating a partial design that defines a portion of a mechanical assembly based on first data received via a user interface, determining a set of design criteria associated with the partial design based on second data received via the user interface, generating, via one or more operations performed by one or more processors, a problem definition based on the partial design and the set of criteria, and causing, via one or more additional operations performed by the one or more processors based on an optimization algorithm, a set of design options to be generated based on the problem definition, wherein each design option included in the set of design options includes a different mechanical assembly derived from the partial design and satisfying the set of design criteria.

At least one advantage of the techniques described herein is that programmatic techniques can be applied to generate design options based on the problem definitions generated via the user interface. Accordingly, the conventional manual design process for mechanical assemblies can be largely automated.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

As noted above, with conventional approaches to designing mechanical assemblies, designers formulate design problems in an ad hoc manner based on intuition and experience. Because this conventional design process does not produce any structured data that defines the design problem, programmatic techniques in general, and generative design algorithms in particular, cannot be applied to generate designs of mechanical assemblies.

To address these issues, embodiments of the invention include a design engine configured to generate a user interface for capturing input data related to a design problem. Based on this input data, the design engine then generates a formalized problem definition that can be processed by a goal-driven optimization algorithm to generate a spectrum of potential design options. Each design option describes a mechanical assembly representing a potential solution to the design problem. An advantage of this approach is that programmatic techniques can be applied to generate design options based on the problem definitions generated via the user interface. Accordingly, the conventional manual design process for mechanical assemblies can be largely automated.

System Overview

Figure 1:
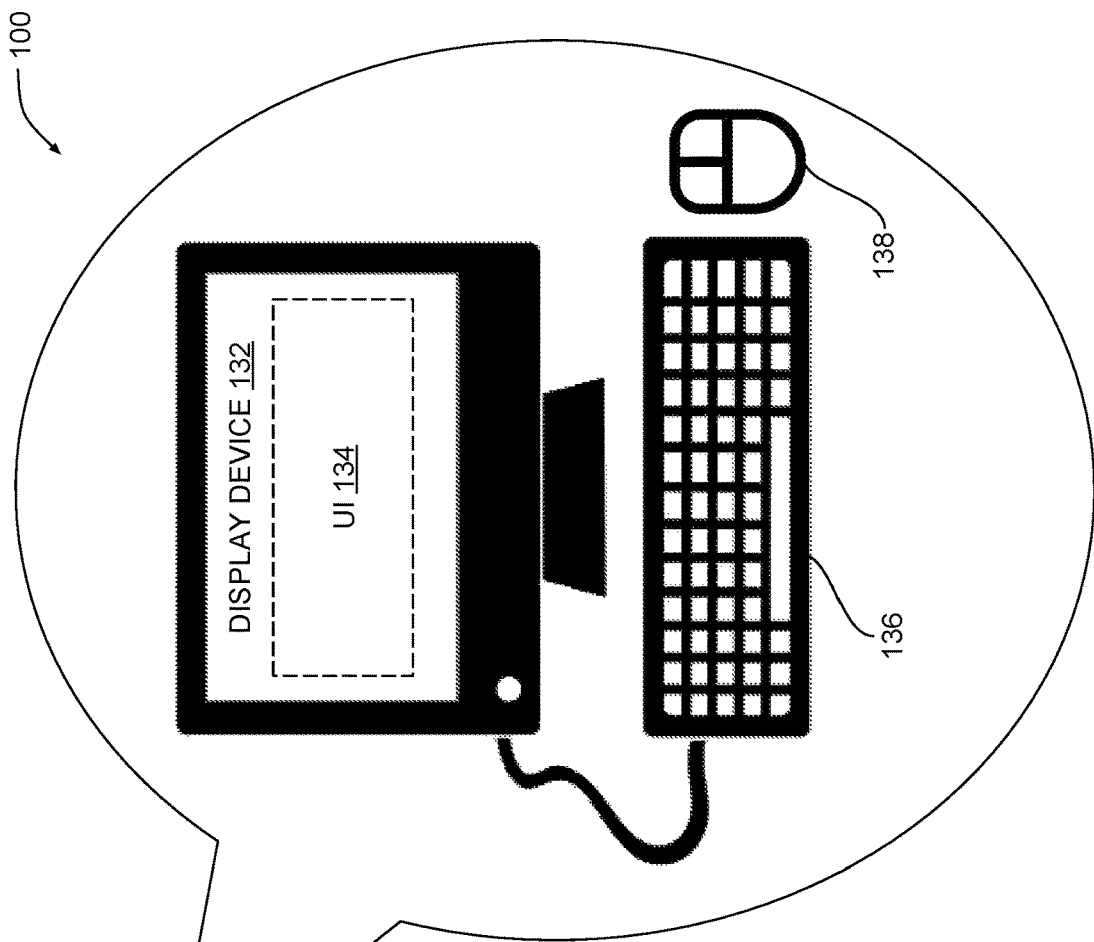
FIG. 1 illustrates a system configured to implement one or more aspects of the present invention.
Figure 1:
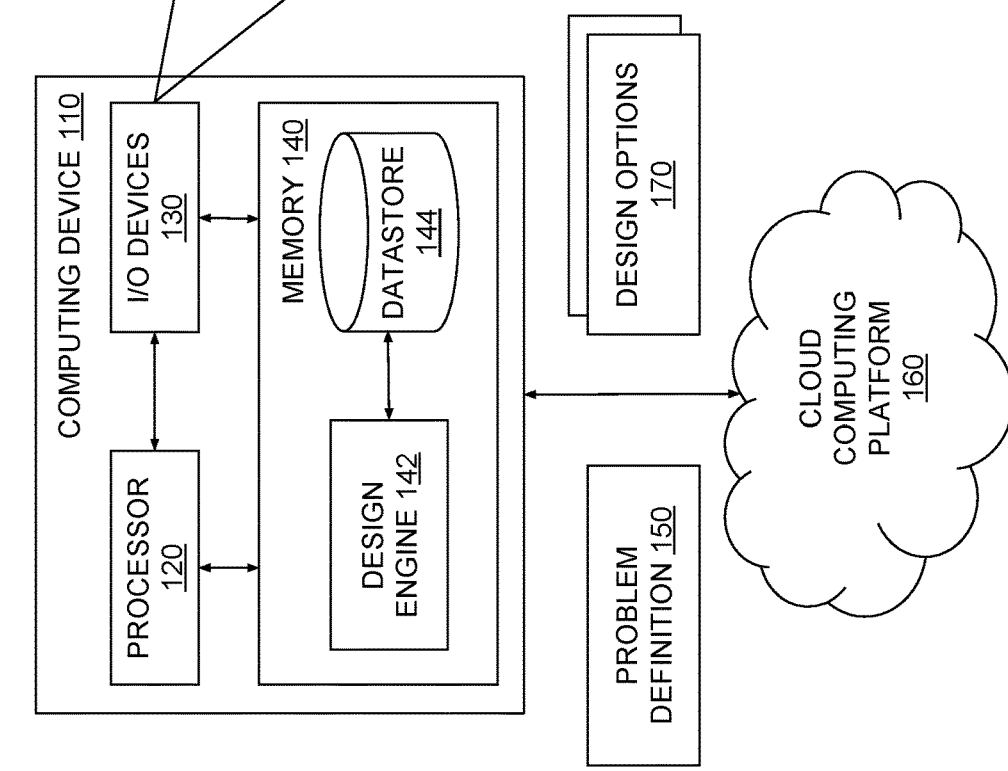

FIG. 1 illustrates a system configured to implement one or more aspects of the present invention. As shown, a system 100 includes a computing device 110 coupled to a cloud computing platform 160. Computing device 110 includes a processor 120, input/output (I/O) devices 130, and a memory 140.

Processor 120 includes any technically feasible set of hardware units configured to process data and execute software applications. Processor 120 could include, for example, one or more central processing units (CPUs), one or more graphics processing units (GPUs), one or more application specific integrated circuits (ASICs), and any combination thereof. I/O devices 130 include any technically feasible set of devices configured to perform input and/or output operations, including a display device 132 that displays a user interface (UI) 134, a keyboard 136, and a mouse 138. I/O devices 130 may further include other types of input and/or output devices not shown here. Memory 140 includes any technically feasible set of storage media configured to store data and software applications. Memory 140 could be, for example, a hard disk, a random-access memory (RAM) module, a read-only memory (ROM), and any combination thereof. Memory 140 includes a design engine 142 and a datastore 144.

Design engine 142 is a software application that, when executed by processor 120, performs a sequence of operations to automatically generate mechanical assembly designs that address a particular design problem. In doing so, design engine 142 first generates and then renders UI 134 for display via display device 132. UI 134 exposes a set of graphical tools to an end-user. The end-user may interact with these graphical tools via display device 132, keyboard 136, mouse 138, and/or other I/O devices 130. Based on data captured via these interactions, design engine 142 generates problem definition 150.

Problem definition 150 is a data structure that formally describes the design problem mentioned above. A given problem definition 150 may indicate specific components that should be included in designs of the mechanical assembly, any physical relationships between those components, a set of objectives that should be met by mechanical assembly designs, a set of constraints that should not be violated by those designs, and optimization parameters to be applied when generating designs. As described in greater detail below in conjunction with FIGS. 2-5B, design engine 142 performs a sequence of operations to generate problem definition 150. Each such operation may be performed based on data captured via a separate graphical tool exposed via UI 134.

Once design engine 142 generates problem definition 150, design engine 142 then transmits that problem definition to cloud computing platform 160. Cloud computing platform 160 includes computing devices (none shown) configured to execute various types of optimization algorithms. Those algorithms may include multi-objective solvers, generative design algorithms, evolutionary and/or genetic algorithms, artificial neural networks including convolutional neural networks and deep learning neural networks, machine learning models, and any other type of goal-oriented programmatic process for generating solutions to complex multi-variable design problems. In one embodiment, the functionality of cloud computing platform 160 is implemented by design engine 142.

Cloud computing platform 160 processes design problem 150 and then iteratively generates one or more design options 170 through a generative design process. A given design option 170 represents a design of a mechanical assembly that is composed of a set of specific components coupled together in a particular manner to meet the objectives indicated in problem definition 150 without violating the constrains indicated in problem definition 150.

According to the techniques described in brief thus far, design engine 142 and UI 132 provide designers of mechanical assemblies with tools that facilitate the formulation of design problems as structured problem definitions. Based on a given problem definition, one or more optimization algorithms can be executed to generate multiple design options representing solutions to the associated design problem. Accordingly, design engine 142 represents a technological improvement over conventional approaches to generating mechanical assemblies, because generating problem definitions in the manner described permits the programmatic generation of multiple design options. Design engine 142 is described in greater detail below in conjunction with FIG. 2.

Figure 2:
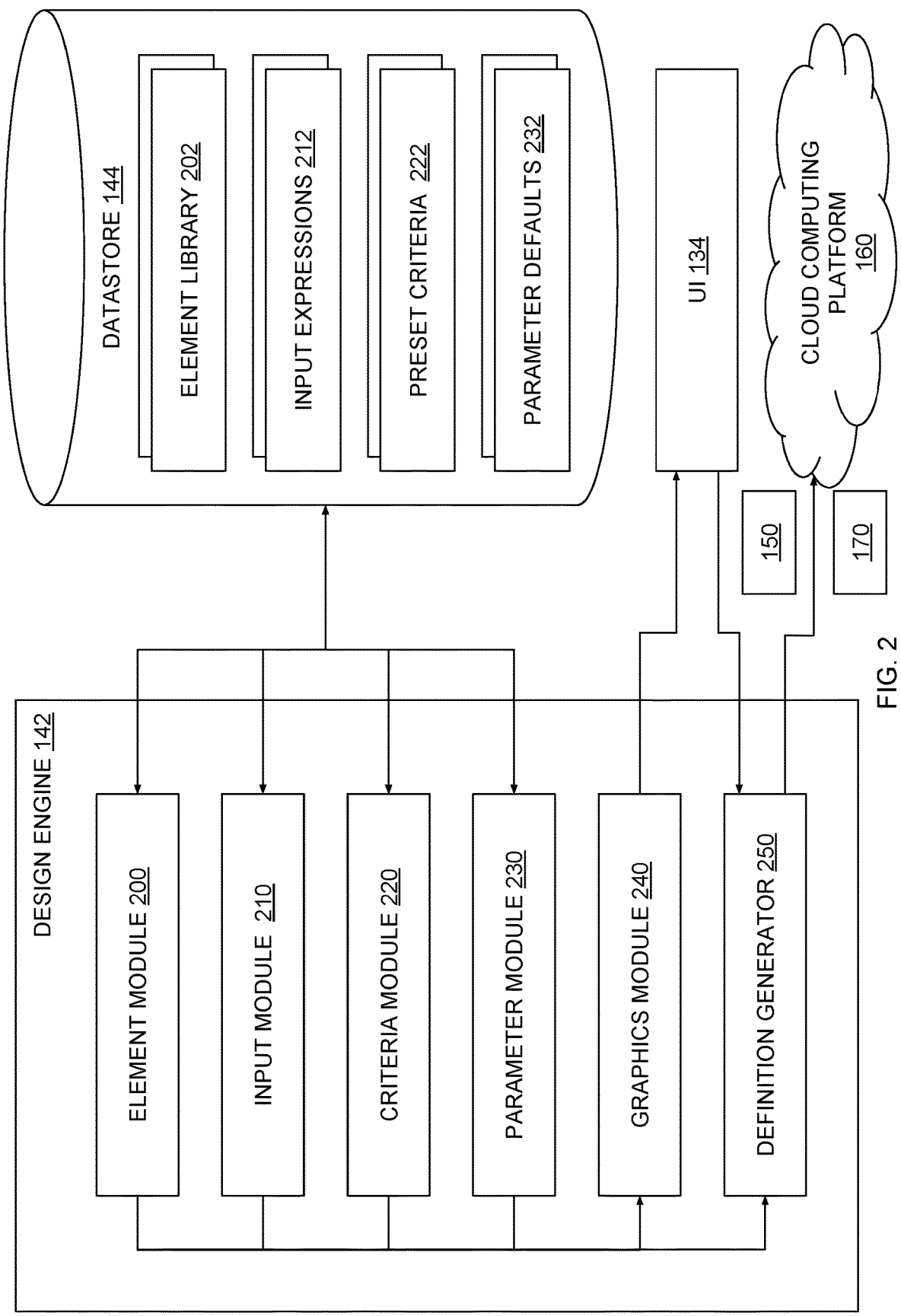
FIG. 2 is a more detailed illustration of the design engine of FIG. 1, according to various embodiments of the present invention.

FIG. 2 is a more detailed illustration of the design engine of FIG. 1, according to various embodiments of the present invention. As shown, UI engine 142 includes an element module 200, an input module 210, a criteria module 220, a parameter module 230, a graphics module 240, and a definition generator 250. Element module 200, input module 210, criteria module 220, and parameter module 230 are configured to interoperate with graphics module 240 to generate different portions of UI 134.

In particular, element module 200 reads element library 202 from datastore 144 and then displays a set of elements to the end-user via UI 134. The set of elements may include components such as solid bodies, springs, and dampers, as well as various types of joints and potentially other parts associated with mechanical assemblies. Based on end-user interactions with UI 132, design engine 142 identifies a selected subset of the set of elements to be included in any of the design options 170 generated by cloud computing platform 160, as described in greater detail below in conjunction with FIG. 3.

Input module 210 reads input expressions 212 from datastore 144 and then displays a set of default expressions to the end-user via UI 134. These expressions may include mathematical relationships indicating specific forces applied to the selected elements. Via interactions with UI 132, the end-user may edit input expressions 212 and add new input expressions, as described in greater detail below in conjunction with FIG. 3.

Criteria module 220 is a software module configured to read preset criteria 322 from datastore 144 and then expose these preset criteria to the end-user via UI 132. These criteria may include objective functions to be met by design options 170 as well as constraints that should not be violated by those design options. Via interactions with UI 132, the end-user may edit preset criteria 222 and add new criteria, as described in greater detail below in conjunction with FIG. 3.

Parameter module 230 is a software module configured to read parameter defaults 232 from datastore 144 and then expose these defaults to the end-user via UI 132. Parameter defaults 232 include default values of input parameters associated with optimization algorithms executed by cloud computing platform 160, including a maximum number of iterations and a maximum number of components to be incorporated into design options 170, among others. Via interactions with UI 132, the end-user may edit parameter defaults 232 and add new optimization parameters, as described in greater detail below in conjunction with FIG. 3.

As a general matter, each of the various modules discussed above generates a different portion of UI 134, and, in doing so, exposes different tools to the end-user that allow the capture of particular data. Data may be captured in a sequential manner based on previously captured data, and so design engine 142 may perform a sequence of operations where one operation depends on the output of a previous operation. For example, element module 200 could generate the selected subset of elements to include in a design option 170, as described, and then input module 210 could receive one or more inputs to be applied to one or more of the elements included in that subset.

Upon capturing the various input data discussed above, UI 134 provides this input data to definition generator 250. Definition generator 250 then generates problem definition 150 and transmits this problem definition to cloud computing platform 160 to initiate the generation of design options 170. In this manner, each module of design engine 142 may perform a different step in an overarching procedure for generating problem definition 150 and then obtaining design options 170.

Exemplary Formulation of a Design Problem

Figure 3:
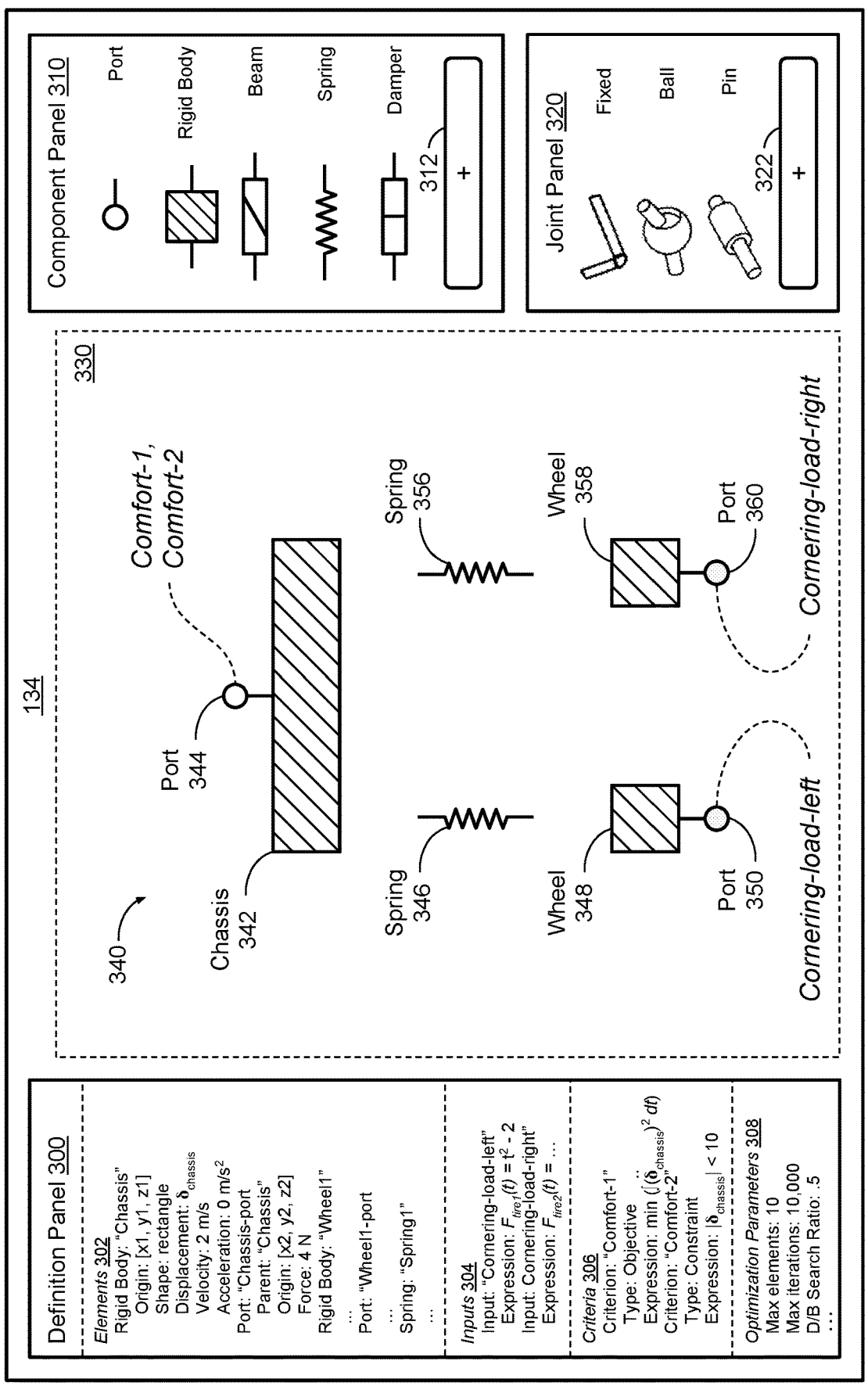
FIG. 3 is a more detailed illustration of the user interface of FIG. 1, according to various embodiments of the present invention.

FIG. 3 is a more detailed illustration of the user interface of FIG. 1, according to various embodiments of the present invention. As shown, UI 134 includes a definition panel 300, a component panel 310, a joint panel 320, and a design space 330. Design space 330 includes a partial design 340.

Definition panel 300 is an interactive area configured to gather input related to a design problem to be solved via generation of a mechanical assembly. Definition panel 300 generally stores data that is used by definition generator 250 described above to generate problem definition 150, including various attributes of partial design 340. Design engine 142 generates partial design 340 based on end-user interactions with component panel 310 and joint panel 320.

Component panel 310 includes a set of component types that may be incorporated into partial design 340 and any design options 170 generated for the mechanical assembly. Those component types may include rigid bodies, beams, springs, and dampers, as well as ports configured to transmit forces, among other types of components. Via add button 312, the end-user selects component types, from a library of available types of components, to be included in component panel 310. When iteratively generating design options 170, cloud computing platform 160 may only incorporate these selected component types into a given design option 170. Based on end-user interactions with component panel 310, design engine 142 includes specific components into partial design 340. Based on end-user interactions with design space 330, design engine 142 arranges these components. UI 134 may also allow the end-user to define additional component types by inputting to UI 134 mathematical expressions that describe the dynamic behavior of those additional component types.

Joint panel 320 includes a set of joints that may be incorporated into partial design 340 and any design options 170 generated for the mechanical assembly. Those joint types may include fixed joints, ball joints, and pin joints, among other types of joints. Via add button 322, the end-user selects joint types, from a library of available types of joints, to be included in joint panel 320. When iteratively generating design options 170, cloud computing platform 160 may only incorporate these selected joint types. Based on end-user interactions with joint panel 320, design engine 142 determines specific joints to be included into partial design 340. Design engine 142 may then arrange these joints based on end-user interactions with design space 330. In one embodiment, UI 134 allows the end-user to define additional joint types by inputting to UI 134 mathematical expressions that describe the dynamic behavior of those additional joint types.

Based on end-user interactions with component panel 310, joint panel 320, and design space 330, design engine 142 generates partial design 340 to include a collection of elements (components and/or joints). In the example shown, partial design 340 includes chassis 342, port 344, springs 346 and 356, wheels 348 and 358, and ports 350 and 360. Ports 350 and 360 have specific loads applied, as is shown. Partial design 340 may be reflective of a design for an automobile. These various elements conceptually form a skeleton of a design option 170. When iteratively generating design options 170, cloud computing platform 160 uses partial design 340 as a starting point to constrain further design iteration.

In one embodiment, design engine 142 provides access via UI 134 to a design library of pre-configured designs and partial designs of mechanical assemblies. This design library may be stored within datastore 144 and populated based on previous end-user interactions with UI 134. Via UI 134, the end-user may browse the design library and then select one or more designs or partial designs to be input to cloud computing platform 160 during the generative design process. If a complete design is selected, then design engine 142 may initiate optimization to modify parameters of this design to meet the design criteria. If a partial design is selected, then design engine 142 may initiate optimization to incorporate additional elements into the design and then optimize parameters of those components to meet the design criteria.

In operation, design engine 142 processes partial design 340 (or a preconfigured design selected from a design library) and then populates definition panel 300 with various data related to partial design 340, including elements 302 and inputs 304. Elements 302 lists all components and joints included in partial design 340 and metadata associated with those elements. For example, elements 302 could indicate chassis 342 and also indicate port 344 coupled to that chassis. Inputs 304 includes expressions that describe loads applied to ports included in partial design 340. Those expressions may include constant values, time-varying functions, or any other mathematically formulated description of forces.

Design engine 142 also populates definition panel 300 with criteria 306. Those criteria may include objective functions and constraint expressions. A given objective function may have any mathematically feasible form, although objective functions are typically defined as equalities. Each objective function indicates an objective that should be met by any design option 170. For example, a given objective function could indicate that the displacement of chassis 342 over time should equal a specific time-varying function. Initially, criteria 306 may include preset criteria 222 described above in conjunction with FIG. 3.

A given constraint expression may have any mathematically feasible form, although constraints typically take the form of inequalities. Each constraint expression indicates a constraint that any design option 170 should not violate. For example, a given constrain expression could indicate that the displacement of chassis 342 should not exceed a specific value. The end-user may directly specify the objective functions and constraint expressions included in criteria 322, or select preset objectives and constraints from a library of available options. In the example shown, objective "Comfort-1" and constraint "Comfort-2" are selected.

Design engine 142 further populates definition panel 300 with optimization parameters 308. Optimization parameters 308 are input values that control the execution of optimization algorithms executed by cloud computing platform 160 when iteratively generating design options 170. In the example shown, optimization parameters 308 indicate a maximum number of elements to include into design options 170, a maximum number of algorithm iterations, and a depth/breadth (D/B) search ratio. Persons familiar with algorithmic optimization will understand that other parameters may also be included in optimization parameters 308.

Figure 4:
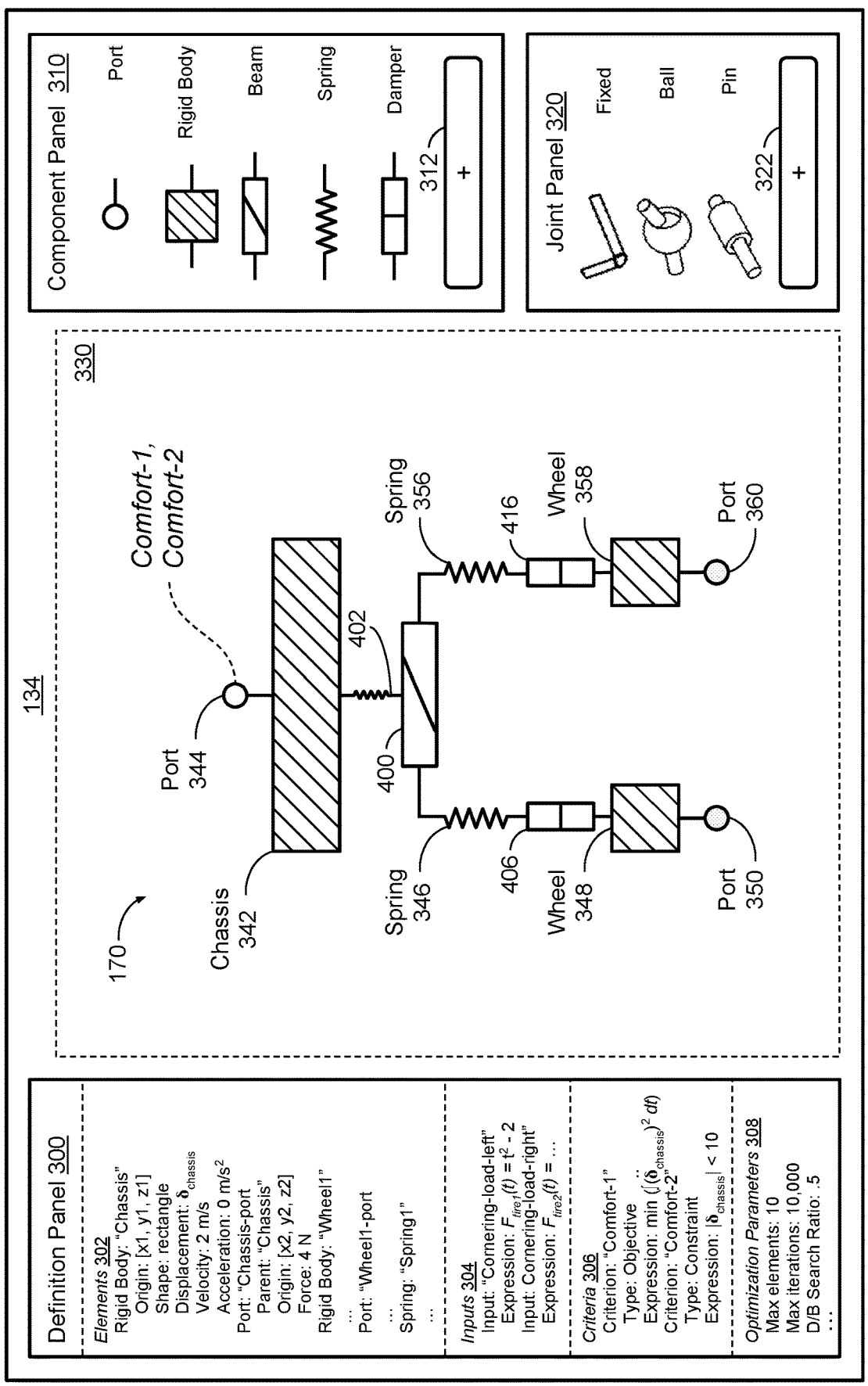
FIG. 4 is an exemplary illustration of one of the design options of FIG. 1, according to various embodiments of the present invention.

Via interactions with the end-user, UI 134 captures a multitude of data associated with the mechanical assembly design problem. Design engine 142 performs a sequence of related operations to process this data. For example, design engine 142 could process end-user inputs to generate the physical arrangement of selected elements indicated in partial design 340. Then, based on that physical arrangement of elements, generate various inputs to specific elements within that arrangement based on end-user interactions with definition panel 300. Based on the data captured via UI 134, design engine 142 then generates problem definition 150 shown in FIG. 1. Again, problem definition 150 is a data structure that formally represents the design problem. Based on problem definition 150, cloud computing platform 160 generates design options 170. Each design option 170 is an extension of partial design 340 and adheres to the various criteria 306 indicated via definition panel 300 when subject to inputs 304 indicated via definition panel 300. FIG. 4 illustrates an exemplary design option 170

FIG. 4 is an exemplary illustration of one of the design options of FIG. 1, according to various embodiments of the present invention. As shown, design option 170 includes the various elements included in partial design 340 discussed above in conjunction with FIG. 3, and also includes additional elements introduced via iterative optimization. Those elements include a beam 400, a spring 402, and dampers 406 and 416. Again, partial design 340 represents a starting point for generating a given design option 170, and therefore any elements found in partial design 340 should also be included in a given design option 170.

During optimization, cloud computing platform 160 implements a generative design process to include additional elements into partial design 340. Cloud computing platform 160 then tests the resultant design to determine a level of adherence to criteria 304 when the design is subjected to inputs 302. Successful designs that meet criteria 304 may be used in an evolutionary manner to inform further design iteration.

Referring generally to FIGS. 3-4, in generating UI 134, design engine 142 advantageously provides designers of mechanical assemblies with a discrete set of interactive tools to facilitate the formulation of a design problem. Based on a sequence of end-user interactions with these tools, design engine 142 performs an associated sequence of operations to generate problem definition 150. Because design engine 142 generates problem definition 150 to represent the design problem, programmatic techniques can be applied to generate a multitude of viable design options addressing the design problem. The approach implemented by design engine 142 is described in stepwise fashion below in conjunction with FIG. 5.

Figure 5A:
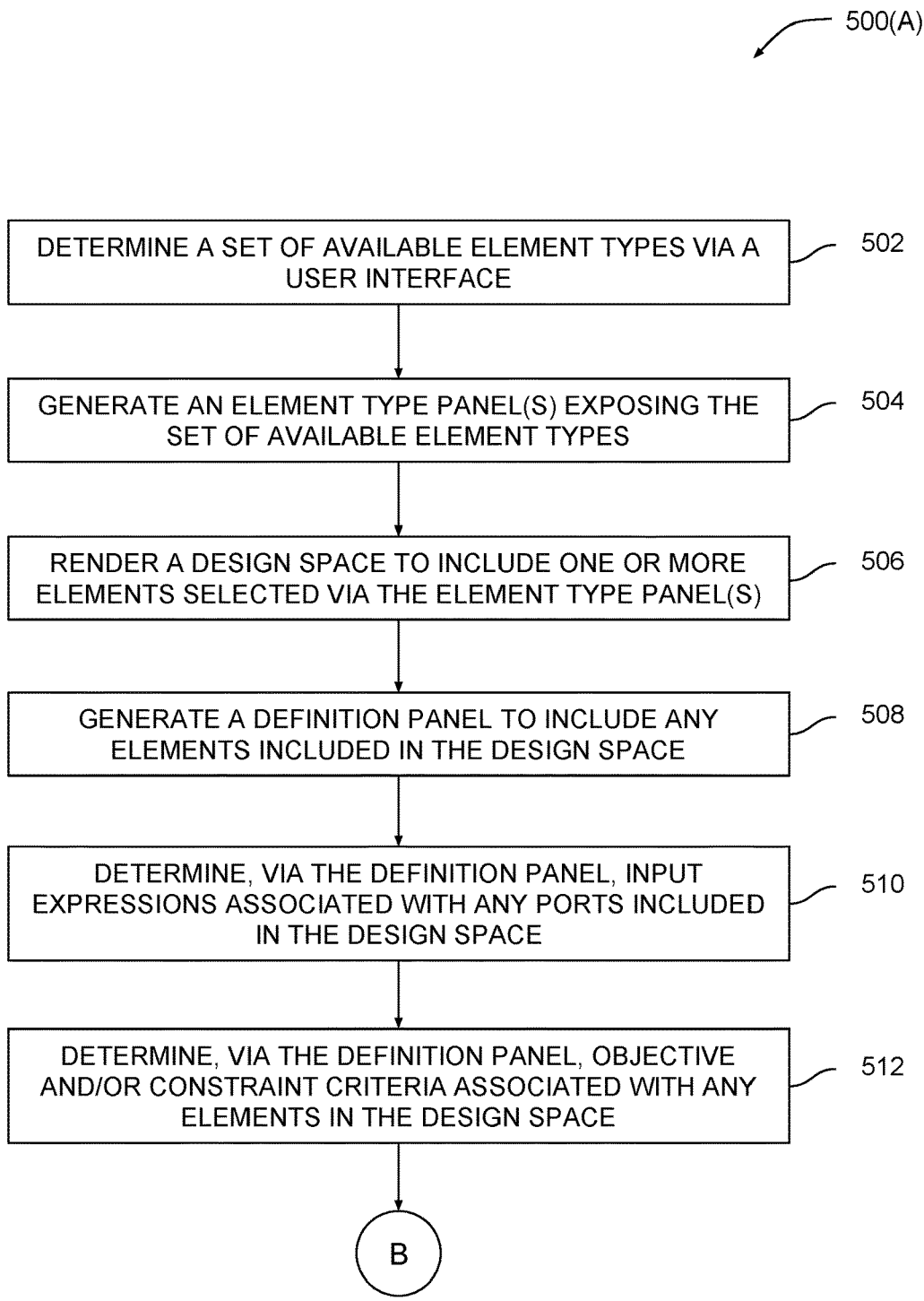
FIGS. 5A-5B set forth a flow diagram of method steps for automatically generating a design option for a mechanical assembly, according to various embodiments of the present invention.
Figure 5B:
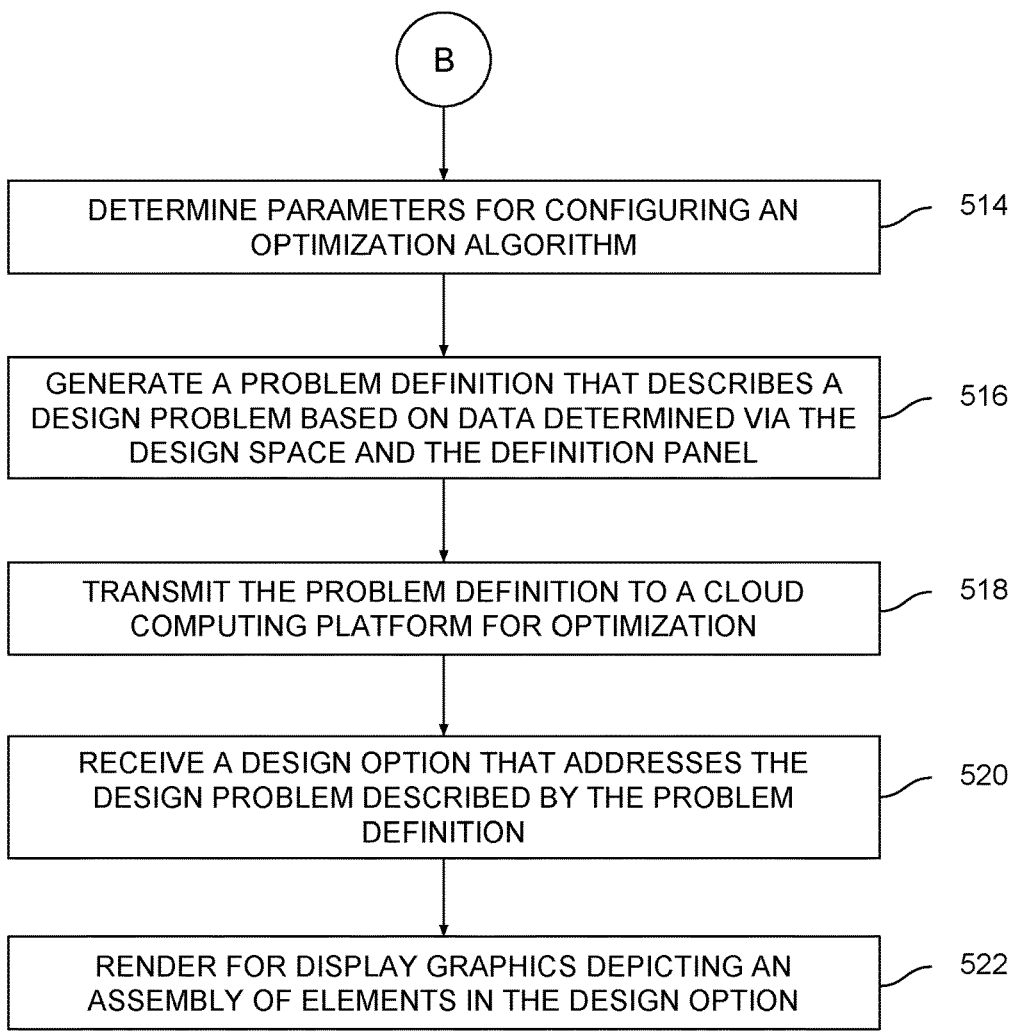

FIGS. 5A-5B set forth a flow diagram of method steps for generating a problem definition via a user interface, according to various embodiments of the present invention. Although the method steps are described in conjunction with the systems of FIGS. 1-4, persons skilled in the art will understand that any system configured to perform the method steps, in any order, is within the scope of the present invention.

As shown in FIG. 5A, a method 500 begins at step 502, where design engine 142 determines a set of available element types based on data captured via UI 134. Those element types may include mechanical components, such as solid bodies or springs, and joints, such as ball joints. At step 504, design engine 142 generates an element type panel(s) exposing the set of available element types. For example, design engine 142 could generate component panel 310 or generate joint panel 320 shown in FIGS. 3-4. At step 506, design engine 142 generates a partial design and then renders a design space that includes the partial design. Design engine 142 generates the partial design based on end-user selections of one or more elements. At step 508, design engine 142 generates a definition panel to include any elements included in the design space.

At step 510, design engine 142 determines, via the definition panel, any input expressions associated with ports included in the design space. These input expressions may include mathematical descriptions of time varying loads applied to elements in the design space, among other expressions. At step 512, design engine 142 determines, via the definition panel, objective and/or constraint criteria associated with any elements in the design space. An objective criterion may include an objective function, whereas a constraint criterion may include a constraint expression.

The method continues in FIG. 5B. At step 514, design engine 142 determines parameters for configuring an optimization algorithm. These parameters may include a maximum number of algorithm iterations, among other algorithm inputs. At step 516, design engine 142 generates a problem definition that describes a design problem based on data determined via the design space and the definition panel. The problem definition is a data structure having a format that can be processed by an optimization algorithm. That format may be reflected in definition panel 300. At step 518, design engine 142 transmits the problem definition to a cloud computing platform for optimization. At step 520, design engine 142 receives a design option 170 that addresses the design problem described by the problem definition. At step 522, design engine 142 renders for display graphics depicting an assembly of elements included in the design option. For example, design engine 142 could render design option 170 shown in detail in FIG. 4.

In sum, a design engine automates portions of a mechanical assembly design process. The design engine generates a user interface that exposes tools for capturing input data related to the design problem. Based on the input data, the design engine performs various operations to generate a formalized problem definition that can be processed by a goal-driven optimization algorithm. The goal-driven optimization algorithm generates a spectrum of potential design options. Each design option describes a mechanical assembly representing a potential solution to the design problem.

At least one advantage of the above approach is that programmatic techniques can be applied to generate design options based on the problem definitions generated via the user interface. Accordingly, the conventional manual design process for mechanical assemblies can be largely automated.

1. Some embodiments of the invention include a computer-implemented method for generating design options for mechanical assemblies, the method comprising: generating a partial design that defines a portion of a mechanical assembly based on first data received via a user interface, determining a set of design criteria associated with the partial design based on second data received via the user interface, generating, via one or more operations performed by one or more processors, a problem definition based on the partial design and the set of criteria, and causing, via one or more additional operations performed by the one or more processors based on an optimization algorithm, a set of design options to be generated based on the problem definition, wherein each design option included in the set of design options includes a different mechanical assembly derived from the partial design and satisfying the set of design criteria.

2. The computer-implemented method of clause 1, wherein the set of design criteria indicates a first objective function that should be met by a first element that is included in the partial design as well as each design option included in the set of design options.

3. The computer-implemented method of any of clauses 1 and 2, wherein the set of design criteria indicates a first constraint expression that should not be violated by a first element that is included in the partial design as well as each design option included in the set of design options.

4. The computer-implemented method of any of clauses 1, 2, and 3, wherein the partial design includes at least one of a solid body, a spring, a damper, and a beam.

5. The computer-implemented method of any of clauses 1, 2, 3, and 4, wherein the partial design further includes at least one port configured to transmit force to a first element included in the partial design.

6. The computer-implemented method of any of clauses 1, 2, 3, 4, and 5, wherein the partial design includes at least one of a fixed joint, a ball joint, and a pin joint.

7. The computer-implemented method of any of clauses 1, 2, 3, 4, 5, and 6, further comprising receiving, via the user interface, a selection of one or more element types from a library of available element types, wherein each design option included in the set of design options includes only the one or more element types.

8. The computer-implemented method of any of clauses 1, 2, 3, 4, 5, 6, and 7, wherein the optimization algorithm comprises a multi-objective solver or a generative design algorithm.

9. The computer-implemented method of any of clauses 1, 2, 3, 4, 5, 6, 7, and 8, further comprising: generating a first portion of the user interface, wherein the first data is received via the first portion, and the first portion displays elements included in the partial design, and generating a second portion of the user interface, wherein the second data is received via the second portion, and the second portion displays the set of design criteria.

10. The computer-implemented method of any of clauses 1, 2, 3, 4, 5, 6, 7, 8, and 9, further comprising: determining a first input applied to a first element of the partial design based on third data received via the user interface, and generating a third portion of the user interface, wherein the third data is received via the third portion, and the third portion displays the first input.

11. Some embodiments of the invention include a non-transitory computer-readable medium storing program instructions that, when executed by a processor, cause the processor to generate design options for mechanical assemblies by performing the steps of: generating a partial design that defines a portion of a mechanical assembly based on first data received via a user interface, determining a set of design criteria associated with the partial design based on second data received via the user interface, generating, via one or more operations performed by one or more processors, a problem definition based on the partial design and the set of criteria, and causing, via one or more additional operations performed by the one or more processors based on an optimization algorithm, a set of design options to be generated based on the problem definition, wherein each design option included in the set of design options includes a different mechanical assembly derived from the partial design and satisfying the set of design criteria.

12. The non-transitory computer-readable medium of clause 11, wherein the set of design criteria indicates a first objective function that should be met by a first element that is included in the partial design as well as each design option included in the set of design options.

13. The non-transitory computer-readable medium of any of clauses 11 and 12, wherein the set of design criteria indicates a first constraint expression that should not be violated by a first element that is included in the partial design as well as each design option included in the set of design options.

14. The non-transitory computer-readable medium of any of clauses 11, 12, and 13, wherein the partial design includes at least one of a solid body, a spring, a damper, and a beam.

15. The non-transitory computer-readable medium of any of clauses 11, 12, 13, and 14, wherein the partial design further includes at least one port configured to transmit force to a first element included in the partial design.

16. The non-transitory computer-readable medium of any of clauses 11, 12, 13, 14, and 15, wherein the partial design includes at least one joint configured to be coupled between a first element and a second element included in the partial design.

17. The non-transitory computer-readable medium of any of clauses 11, 12, 13, 14, 15, and 16, further comprising the steps of receiving, via the user interface, a selection of one or more element types from a library of available element types, wherein each design option included in the set of design options includes only the one or more element types.

18. The non-transitory computer-readable medium of any of clauses 11, 12, 13, 14, 15, 16, and 17, further comprising: generating a first portion of the user interface, wherein the first data is received via the first portion, and the first portion displays elements included in the partial design, generating a second portion of the user interface, wherein the second data is received via the second portion, and the second portion displays the set of design criteria, and generating a third portion of the user interface, wherein third data is received via the third portion that indicates a first input applied to a first element of the partial design, and the third portion displays the first input.

19. The non-transitory computer-readable medium of any of clauses 11, 12, 13, 14, 15, 16, 17, and 18, further comprising determining a first optimization parameter input to the optimization algorithm based on fourth data captured via the user interface, and generating a fourth portion of the user interface, wherein the fourth data is received via the fourth portion, and the fourth portion displays the first optimization parameter.

20. Some embodiments of the invention include a system for generating design options for mechanical assemblies, comprising: a memory storing a design engine, and a processor that, upon executing the design engine, is configured to perform the steps of: generating a partial design that defines a portion of a mechanical assembly based on first data received via a user interface, determining a set of design criteria associated with the partial design based on second data received via the user interface, generating, via one or more operations performed by the processor, a problem definition based on the partial design and the set of criteria, and causing, via one or more additional operations performed by the processor based on an optimization algorithm, a set of design options to be generated based on the problem definition, wherein each design option included in the set of design options includes a different mechanical assembly derived from the partial design and satisfying the set of design criteria.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for generating design options for mechanical assemblies, the method comprising:
receiving, via a graphical user interface, one or more optimization parameters associated with an optimization algorithm;
generating, via one more processors included in a computing system, a problem definition based on a partial design for at least a portion of a mechanical assembly and a set of design criteria;
executing the optimization algorithm, via the one or more processors, to generate a first set of design options based on the problem definition and the one or more optimization parameters, wherein each design option included in the first set of design options includes a different mechanical assembly that is derived from the partial design and satisfies the set of design criteria;
as part of a first design iteration, analyzing a level of adherence to the set of design criteria when the one or more design options are subjected to interactive user input in order to identify one or more successful design options included in the one or more design options; and
as part of a second design iteration, generating a second set of design options based on the one or more successful design options identified as part of the first design iteration.

2. The computer-implemented method of claim 1, wherein the set of design criteria indicates a first objective function that should be met by a first element included in the partial design.

3. The computer-implemented method of claim 1, wherein the set of design criteria indicates a first objective function that should be met by each design option included in the first set of design options.

4. The computer-implemented method of claim 1, wherein the set of design criteria indicates a first constraint expression that should not be violated by a first element included in the partial design.

5. The computer-implemented method of claim 1, wherein the set of design criteria indicates a first constraint expression that should not be violated by any design option included in the first set of design options.

6. The computer-implemented method of claim 1, wherein the partial design includes at least one of a solid body, a spring, a damper, or a beam.

7. The computer-implemented method of claim 6, wherein the partial design further includes at least one part that transmits force to a first element included in the partial design.

8. The computer-implemented method of claim 1, wherein the partial design includes at least one of a fixed joint, a ball joint, or a pin joint.

9. The computer-implemented method of claim 1, further comprising receiving, via a user interface, a selection of one or more element types from a library of available element types, wherein each design option included in the first set of design options includes only the one or more element types.

10. The computer-implemented method of claim 1, wherein the optimization algorithm comprises a multi-objective solver or a generative design algorithm.

11. One or more non-transitory computer-readable media storing program instructions that, when executed by one or more processors, cause the one or more processors to generate design options for mechanical assemblies by performing the steps of:
receiving, via a graphical user interface, one or more optimization parameters associated with an optimization algorithm;
generating, via one more processors included in a computing system, a problem definition based on a partial design associated with at least a portion of a mechanical assembly and a set of design criteria;
executing the optimization algorithm, via the one or more processors, to generate a first set of design options based on the problem definition and the one or more optimization parameters, wherein each design option included in the first set of design options includes a different mechanical assembly that is associated with the set of design criteria;
as part of a first design iteration, analyzing a level of adherence to the set of design criteria when the first set of design options are subjected to interactive user input in order to identify one or more successful design options included in the first set of design options; and
as part of a second design iteration, generating a second set of design options based on the one or more successful design options.

12. The one or more non-transitory computer-readable media of claim 11, wherein the set of design criteria indicates a first objective function that should be met by a first element included in the partial design.

13. The one or more non-transitory computer-readable media of claim 11, wherein the set of design criteria indicates a first objective function that should be met by each design option included in the first set of design options.

14. The one or more non-transitory computer-readable media of claim 11, wherein the set of design criteria indicates a first constraint expression that should not be violated by a first element included in the partial design.

15. The one or more non-transitory computer-readable media of claim 11, wherein the set of design criteria indicates a first constraint expression that should not be violated by any design option included in the first set of design options.

16. The one or more non-transitory computer-readable media of claim 11, wherein the partial design includes at least one of a solid body, a spring, a damper, or a beam.

17. The one or more non-transitory computer-readable media of claim 16, wherein the partial design further includes at least one part that transmits force to a first element included in the partial design.

18. The one or more non-transitory computer-readable media of claim 11, wherein the partial design includes at least one of a fixed joint, a ball joint, or a pin joint.

19. The one or more non-transitory computer-readable media of claim 11, further comprising receiving, via a user interface, a selection of one or more element types from a library of available element types, wherein each design option included in the first set of design options includes only the one or more element types.

20. The one or more non-transitory computer-readable media of claim 11, wherein the optimization algorithm comprises a multi-objective solver or a generative design algorithm.

21. A system, comprising:
one or more memories that include instructions; and
one or more processors that are coupled to the one or more memories and, when executing the instructions, are configured to perform the steps of:
receiving, via a graphical user interface, one or more optimization parameters associated with an optimization algorithm;
generating, via one more processors included in a computing system, a problem definition based on a partial design associated with at least a portion of a mechanical assembly and a set of design criteria;
executing the optimization algorithm, via the one or more processors, to generate a first set of design options based on the problem definition and the one or more optimization parameters, wherein each design option included in the first set of design options includes a different mechanical assembly;
as part of a first design iteration, analyzing a level of adherence to the set of design criteria when the first set of design options are subjected to interactive user input in order to identify one or more successful design options included in the first set of design options; and
as part of a second design iteration, generating a second set of design options based on the one or more successful design options.

* * * * *